(12) United States Patent
Patel et al.

(10) Patent No.: US 9,992,286 B2
(45) Date of Patent: Jun. 5, 2018

(54) SYSTEM AND METHOD FOR IMPLEMENTING CALL SESSION QUALITY INDICATOR

(71) Applicant: Kodiak Networks Inc., Plano, TX (US)

(72) Inventors: Krishnakant M. Patel, Richardson, TX (US); Ravi Ayyasamy, Richardson, TX (US); Shibu Narendranathan, Allen, TX (US); Bibhudatta Biswal, Richardson, TX (US); Bharat Ram Setti, Plano, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 125 days.

(21) Appl. No.: 15/331,042

(22) Filed: Oct. 21, 2016

(65) Prior Publication Data

US 2017/0118666 A1  Apr. 27, 2017

Related U.S. Application Data

(60) Provisional application No. 62/245,856, filed on Oct. 23, 2015.

(51) Int. Cl.
| | |
|---|---|
| *H04L 29/08* | (2006.01) |
| *H04L 29/06* | (2006.01) |
| *H04W 4/10* | (2009.01) |
| *H04W 76/25* | (2018.01) |
| *H04W 24/08* | (2009.01) |
| *H04W 24/10* | (2009.01) |

(52) U.S. Cl.
CPC ........ *H04L 67/145* (2013.01); *H04L 65/1066* (2013.01); *H04L 65/1083* (2013.01); *H04L 69/16* (2013.01); *H04W 4/10* (2013.01); *H04W 24/08* (2013.01); *H04W 24/10* (2013.01); *H04W 76/25* (2018.02)

(58) Field of Classification Search
CPC ..... H04W 76/10; H04W 76/12; H04W 76/19; H04W 76/25; H04W 4/10; H04W 24/08; H04L 67/14; H04L 67/141; H04L 67/142; H04L 67/143; H04L 67/145; H04L 65/1066; H04L 65/1069; H04L 65/1083
See application file for complete search history.

(56) References Cited

U.S. PATENT DOCUMENTS

| | | | |
|---|---|---|---|
| 7,933,263 B1 | 4/2011 | Huang | |
| 7,995,589 B2 | 8/2011 | Sollee et al. | |
| 2005/0064821 A1 | 3/2005 | Hedberg et al. | |
| 2007/0258379 A1 | 11/2007 | Ekstrom et al. | |
| 2007/0291693 A1* | 12/2007 | Schultz ................. | H04W 28/18 370/331 |

(Continued)

*Primary Examiner* — Ashley Shivers

(57) ABSTRACT

An embodiment method includes receiving, by a server of a telecommunications services platform, a request for a first call session quality indicator (CSQI) of a first client device, determining, by the server, first channel parameters of a first channel between the server and the first client device, and calculating, by the server, the first CSQI of the first client device in accordance with the first channel parameters of the first channel. The method further includes transmitting, by the server, the first CSQI to the first client device and receiving, by the server, a call session initiation request from the first client device after transmitting the first CSQI to the first client device.

24 Claims, 11 Drawing Sheets

(56) References Cited

U.S. PATENT DOCUMENTS

| 2010/0040050 A1 | 2/2010 | Johnston | |
|---|---|---|---|
| 2010/0040134 A1* | 2/2010 | Sun | H04L 47/11 |
| | | | 375/240.01 |
| 2012/0102131 A1* | 4/2012 | Lin | H04L 12/66 |
| | | | 709/207 |

* cited by examiner

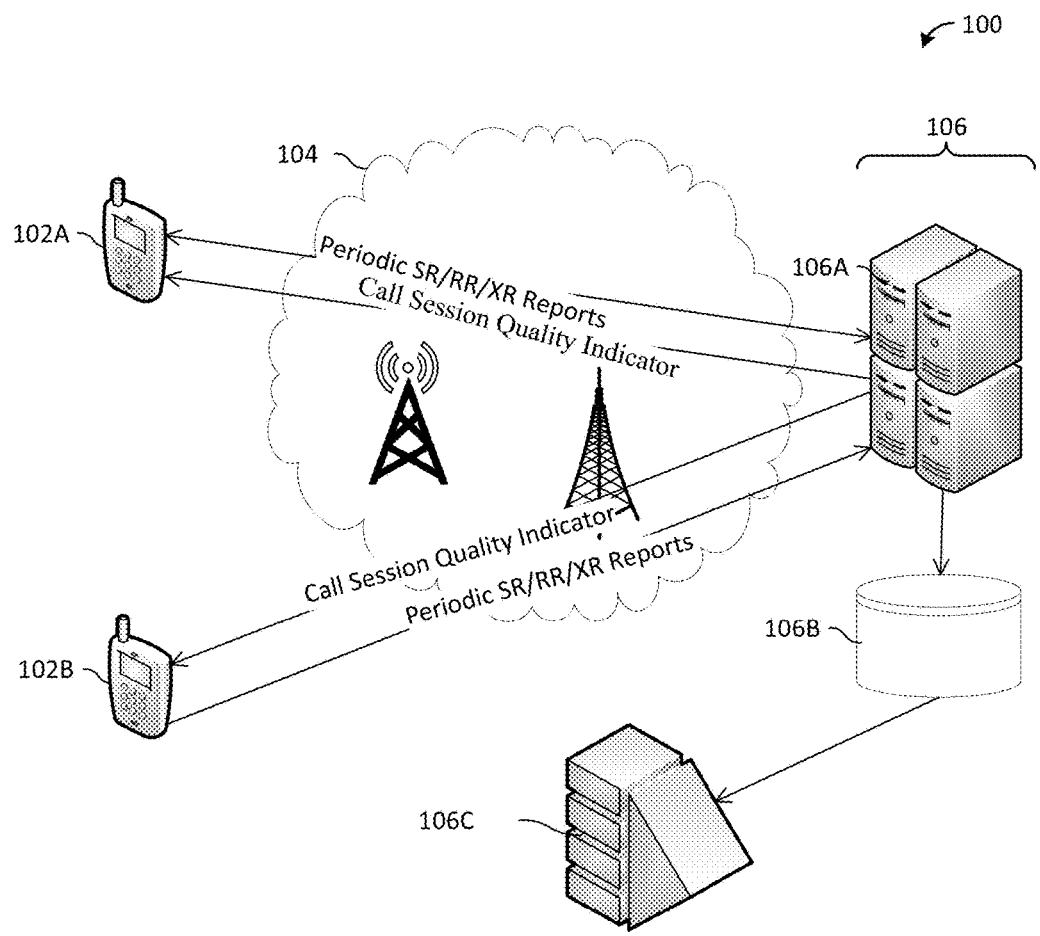
*Fig. 2*
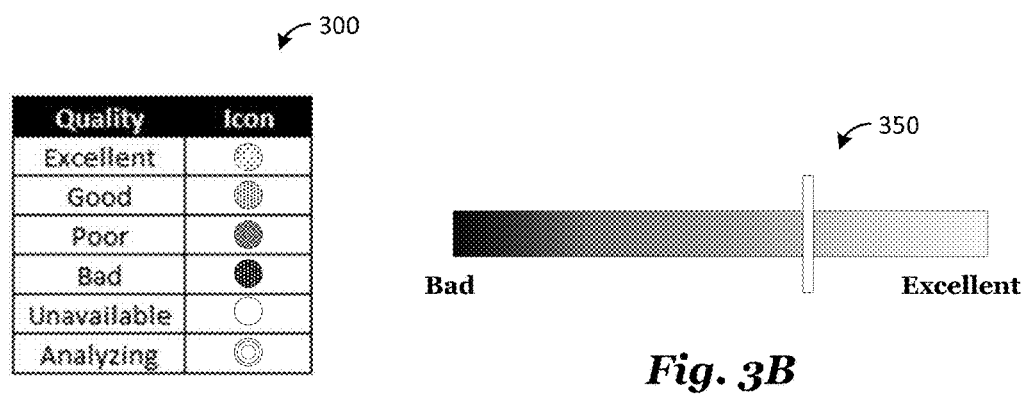
*Fig. 3A*
*Fig. 3B*

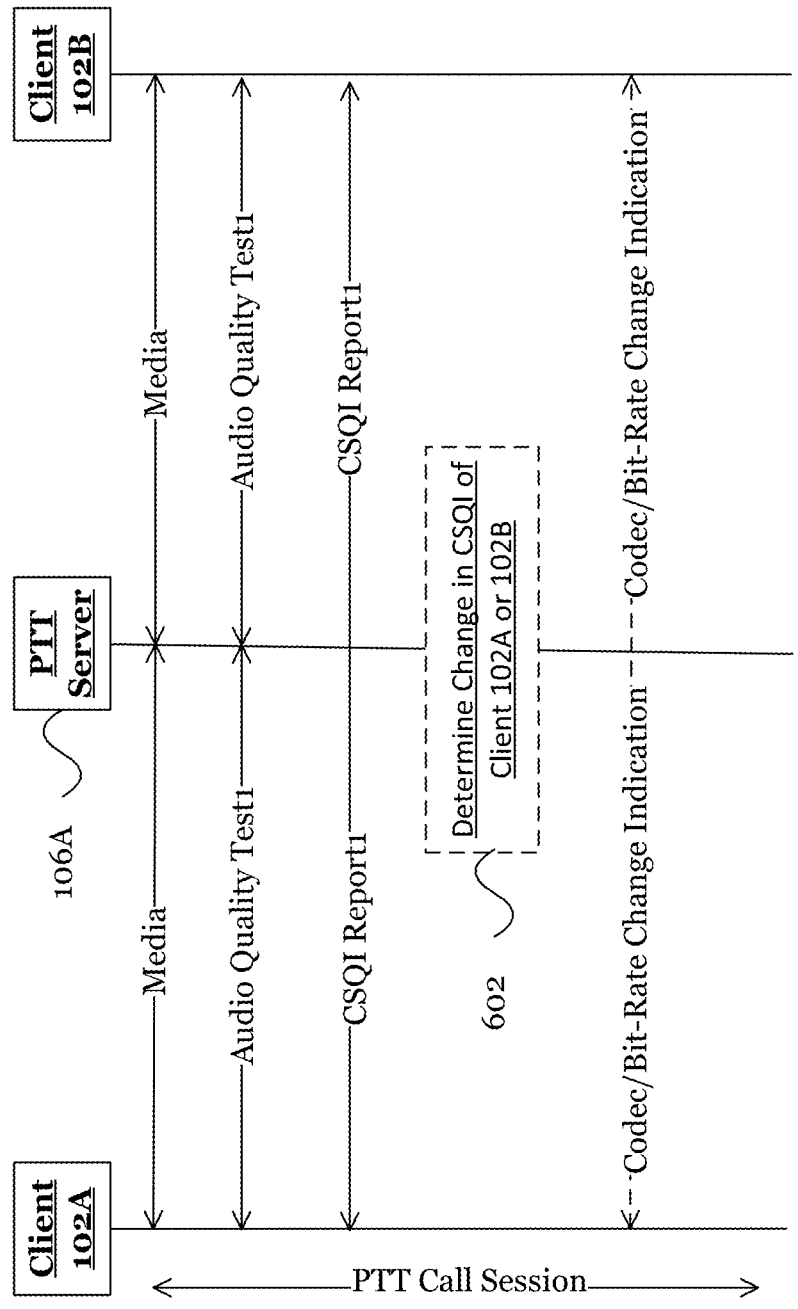

SYSTEM AND METHOD FOR IMPLEMENTING CALL SESSION QUALITY INDICATOR

CROSS-REFERENCE TO RELATED APPLICATIONS

This application claims the benefit of U.S. Provisional Application No 62/245,856, filed on Oct. 23, 2015, which application is hereby incorporated herein by reference.

TECHNICAL FIELD

The present invention relates generally to communications over a telecommunications network, and in particular embodiments, to techniques and mechanisms for call session quality indicator implementation.

BACKGROUND

Push-to-Talk (PTT) platforms involve providing PIT functionality (e.g., call group management, call origination, call transmittal, talk-back call termination, floor management, filtering, etc.) through clients on client devices. The PTT functions may be performed by one or more servers, and communications between the client devices and the servers may be performed over a network. PIT users (e.g., callers) may not be aware of the quality of a PTT call the user is making or about to make in a given network environment (e.g., cellular, WiFi, wired network, or the like). For example, a user may be unaware of the user's network quality/conditions or a called party's network quality/conditions. However, performing connection quality indication tests are resource intensive if done continuously. Furthermore, signal strength is not a reliable indication of PTT service quality because service quality may depend on various other factors such as jitter, latency, bandwidth (bitrate used), packet loss, packet throughput, and the like in addition to signal strength. Furthermore, continued use of high bandwidth codecs to encode data may render a network even more congested especially under congested network conditions. Unavailability of network conditions per cell and time of day may also render dynamic application of intelligent system planning difficult.

SUMMARY

In accordance with an embodiment, a method includes receiving, by a server of a telecommunications services platform, a request for a first call session quality indicator (CSQI) of a first client device, determining, by the server, first channel parameters of a first channel between the server and the first client device, and calculating, by the server, the first CSQI of the first client device in accordance with the first channel parameters of the first channel. The method further includes transmitting, by the server, the first CSQI to the first client device and receiving, by the server, a call session initiation request from the first client device after transmitting the first CSQI to the first client device. In an embodiment, determining the first channel parameters includes transmitting a sequence of packets between the server and the first client device, wherein the sequence of packets comprises dummy audio data and determining the first channel parameters in accordance with measurements made using the sequence of packets. In an embodiment, determining the first channel parameters includes receiving a real-time transport control protocol (RTCP) extended report (XR), a RTCP sender report (SR), a RTCP receiver report (RR), or a combination thereof from the first client device. In an embodiment, the method includes the server receiving a CSQI trigger prior to receiving the request for the first CSQI of the first client device. In an embodiment, the method further includes receiving, by the server, a request for a second CSQI of a second client device from the first client device; determining, by the server, the second CSQI; and transmitting, by the server, the second CSQI to the first client device. In an embodiment, determining the second CSQI includes determining, by the server, a cached second CSQI of the second client device is available to the server. In an embodiment when the second client device is a contact on a predictive wakeup (PW) list of the first client device, and the method further includes determining, by the server, second channel parameters of a second channel between the server and the second client device; and calculating, by the server, the second CSQI of the second client device in accordance with the second channel parameters of the second channel prior to receiving the request for the second CSQI. In an embodiment, transmitting, by the server, a CSQI trigger to the second client device; receiving, by the server, a CSQI request for the second CSQI from the second client device; determining, by the server, second channel parameters of a second channel between the server and the second client device; and calculating, by the server, the second CSQI of the second client device in accordance with the second channel parameters of the second channel after receiving the request for the second CSQI. In an embodiment, the method further includes initiating, by the server, a call session between the first client device and one or more second client devices in response to the call session initiation request; determining, by the server, respective CSQI's of participants of the call session at regular intervals throughout the call session; and transmitting, by the server, a CSQI report to the first client device. The CSQI report comprises at least a third CSQI of the first client device. In an embodiment, the CSQI report further includes a fourth CSQI of a client device of the one or more second client devices with floor control, an average group CSQI of the one or more second client devices, or a combination thereof. In an embodiment, the method further includes detecting, by the server, a change in CSQI of a participant of the call session; and adapting, by the server, a codec, bit-rate, or a combination thereof of at least one leg of the call session in response to the change in CSQI. In an embodiment, the telecommunications services platform is a push-to-talk (PTT) platform, and the method further includes receiving, by the server, a CellID identifying a cell where the first client device is located; storing, by the PTT platform, the first CSQI, the first channel parameters, or a combination thereof; and generating one or more reports in accordance with the first CSQI, the first channel parameters, or the combination thereof.

In accordance with an embodiment, a method includes detecting, by an application client on a first client device, a first call session quality indicator (CSQI) trigger event and in response to the first CSQI trigger event, transmitting, by the application client, a request for a first CSQI of the first client device to a server of a telecommunications services platform. The request for the first CSQI is transmitted while the first client device is not actively engaged in any call sessions. The method further includes receiving, by the application client, the first CSQI from the server and providing, by the application client, feedback of the first CSQI to a user operating the first client device. In an embodiment, the method further includes after providing feedback of the first CSQI, transmitting, by the application client, a call session initiation request to the server. In an embodiment, providing feedback of the first CSQI includes displaying an icon indicating the first CSQI on a screen of the application client, displaying a sliding bar indicating the first CSQI on a screen of the application client, providing audio feedback of the first CSQI, providing vibrational feedback of the first CSQI, or a combination thereof. In an embodiment, the method further includes determining, by the application client, one or more channel parameters of a first channel between the first client device and the server and transmitting, by the application client, the one or more channel parameters in a channel parameter report to the server, wherein the first CSQI is determined in accordance with the channel parameter report. In an embodiment, the first CSQI trigger event includes the user launching the application client, the user bringing the application client to a foreground of the first client device, the user moving to a contact list tab in the application client, the user selecting a contact from a contact list, the first client device receiving a predictive wakeup message from the server, or a combination thereof. In an embodiment, the method further includes detecting, by the application client, a second CSQI trigger event; in response to the second CSQI trigger event, transmitting, by the application client, a request for a second CSQI of a second client device to the server; receiving, by the application client, the second CSQI from the server; and providing, by the application client, feedback of the second CSQI to the user. In an embodiment, the second CSQI trigger event includes the user selecting the second client device from a contact list.

In accordance with an embodiment, a server of a push-to-talk (PTT) platform comprising: a processor and a non-transitory computer readable storage medium storing programming for execution by the processor. The programming includes instructions to receive a request for a first call session quality indicator (CSQI) of a first client device; determine first channel parameters of a first channel between the server and the first client device; calculate the first CSQI of the first client device in accordance with the first channel parameters of the first channel; transmit the first CSQI to the first client device; and receive a call session initiation request from the first client device after transmitting the first CSQI to the first client device. In an embodiment, the first channel parameters include jitter, latency, bandwidth, packet loss, or a combination thereof. In an embodiment, the first channel parameters are determined in accordance with a sequence of packets transmitted between the server and the first client device. In an embodiment, the programming includes further instructions to initiate a call session between the first client device and one or more second client devices in response to the call session initiation request; determine respective CSQI's of participants of the call session at regular intervals throughout the call session; and transmit a CSQI report to the first client device, wherein the CSQI report comprises at least a third CSQI of the first client device.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1 and 2 are diagrams of a communications system according to various embodiments;

FIGS. 3A and 3B illustrate embodiment visual feedback for call session quality indicators;

FIGS. 4A, 4B, 5A, 5B, 6A, and 6B are process flows for implementing call session quality indicators according to various embodiments;

Corresponding numerals and symbols in the different figures generally refer to corresponding parts, unless otherwise indicated. The Figures are drawn to representatively illustrate relevant aspects of various embodiments, and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

Although various embodiments are described in a particular context, e.g., call session quality indicator (CSQI) implementation within a Push-to-Talk (PTT) platform, various embodiments may also apply to other telecommunications services platforms where call session quality indicator implementation is desired.

In various embodiments, a call session quality indicator (CSQI, sometimes referred to as kall quality indicator (KQI)) enables users of a telecommunications platform to predict call session connection quality prior to a call and to determine call connection quality during a call. Embodiments provide estimated call session connection quality (e.g., CSQI) of a client device and contacts (e.g., potential called parties) before a call session begins. The CSQI's of a client device and called part(ies) may also be provided to the user during a call session between the client device and called part(ies). Various embodiments may also enable adaptations if the CSQI varies during the call. For example, call quality may degrade and/or improve throughout the call depending on network characteristics, such as latency, jitter, bandwidth (bitrate used), packet loss, combinations thereof, and the like. A server may adapt to call quality variation by adjusting one or more parameters, such as codec and/or bit-rate in response to changes to CSQI during the call, which advantageously optimizes (or at least improves) user experience. Thus, various embodiments provide one or more of the following non-limiting features: rendering feedback on an application client indicating estimated call quality of the application client and a one or more client contacts (e.g., potential call parties) before making a call; rendering feedback indicating call quality of a client device and a speaker (e.g., party having floor control) throughout the call; and/or adapting codec/bitrates depending on network conditions before the call or during the call when connection quality varies.

Figure 1:
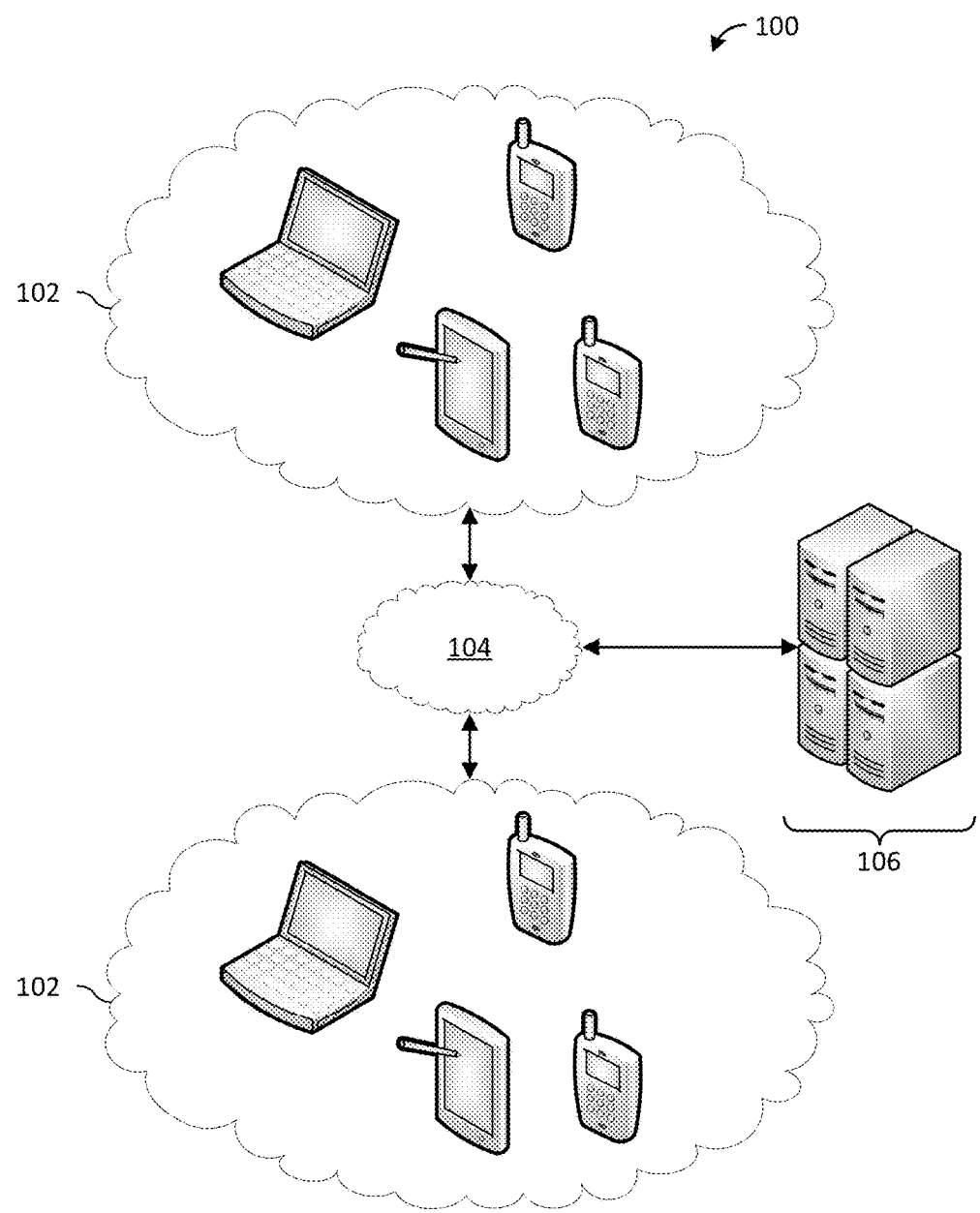

FIG. 1 is a diagram of a communications system 100, which provides an architecture for supporting a telecommunications solution (e.g., a push-to-talk (PTT) communications solution) in accordance with some embodiments. Communications system 100 includes client devices 102, a communications network 104, and a telecommunications services platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "clients") reside on the client devices 102 for accessing various functions, such as PTT functions, provided by the telecommunications solution.

Client devices 102 may communicate with the telecommunications services platform 106 over the communications network 104, which may be accessed by the client devices 102 through a cellular network deployed by a carrier, a WiFi network, a RAN, other wireless networks, a wired internet protocol (IP) network, combinations thereof, or the like. Communications network 104 may include one or more components (e.g., base stations) configured to provide wireless or wired network access, such as an enhanced Node B (eNB), a macro-cell, a femtocell, a Wi-Fi access point (AP), combinations thereof, or the like. Furthermore, communications network 104 may operate in accordance with one or more wireless communication protocols, e.g., open mobile alliance (OMA), LTE, LTE advanced (LTE-A), High Speed Packet Access (HSPA), Wi-Fi 802.11a/b/g/n/ac, etc. In some embodiments, communications network 104 may comprise various other devices, such as relays, low power nodes, etc. Communications network 104 may further include backhaul network components, such as various gateways, routers, controllers, schedulers, and the like.

In an embodiment where telecommunications services platform 106 is a PoC platform, subscribers to a PTT solution (e.g., users operating the client devices 102) may be provisioned onto communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform may provide a plurality of PTT functions to the client devices 102 through the PTT clients on the client devices 102 as described in greater detail below.

In some embodiments, telecommunications services platform 106 uses container technology for virtualization of a telecommunications system architecture, such as, the virtualization of provided PTT services. Example container technologies may include Docker, Rocket, LXD, and the like although the architecture is not limited to a specific container technology. Virtualization using container technology may allow the telecommunications services platform 106 to adopt a micro-services model in which service clusters are considered the building blocks of the system architecture. For example, each function provided by the telecommunications services platform 106 may be virtualized in a unique service cluster, and each service cluster may perform a different function in the telecommunications services platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the telecommunications services platform) to be independently deployed and managed. Thus, system resilience may be improved as failures are localized to individual services. Furthermore, rapid and agile deployment of services may also be achieved.

In some embodiments, telecommunications services platform 106 incorporates distributed databases, clustering technologies, data analytics tools, and messaging middleware to provide a robust, scalable platform. Telecommunications services platform 106 may use fully virtualized components with a layered approach to service orchestration, which allows telecommunications services platform 106 to be integrated into various cloud environments, such as a carrier's private cloud infrastructure, a dedicated PTT cloud infrastructure, combinations thereof, and the like. A more detailed description of an embodiment telecommunications services platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PIT platforms, may be used in other embodiments.

The traffic patterns of PTT typically have several characteristics. Group calls are common, which may require a large number of radio resources to be simultaneously used and may require significant downlink traffic compared to uplink traffic. Traffic is typically one-way, e.g., a particular speech direction (talker to listener(s)), and there may be a clear indication of speech direction changes (via a floor control). For example, at any given point-in-time during a call, only a user with floor control speaks with the other participants (e.g., users without floor control) of the call listening. The end-to-end call setup time is typically critical, and in some embodiments may need to be less than about 500 ms. The floor request ACK time may also be critical, and in some embodiments may need to be less than about 200 ms. Calls are typically shorter, but more frequent, and call setup/teardown may be performed frequently. There may be fewer silence periods between speech, and participants typically release the floor when they are not talking.

FIG. 2 illustrates CSQI signaling in communications system 100 having client devices 102A and 102B, components (e.g., server 106A, data store 106B, and processor 106C) of telecommunications services platform 106, and communications network 104. As described above, clients 102A/102B communicate with telecommunications services platform 106 using communications network 104. Network 104 may provide one or more suitable access network connections, such as a cellular (3G/4G/LTE) connection, a WiFi connection, a wired network, combinations thereof, or the like. Although the described embodiments are described in the context of network 104 being a cellular network and platform 106 being a PIT platform, various embodiments may also be applied to other types of access networks and/or other types of telecommunication services platforms.

When a client application on a client device (e.g., client device 102A or 102B) detects a pre-defined event (e.g., a user bringing the application client to the foreground of the client device, a user opening a particular screen, such as contacts, of the application client, a user selecting a contact from the contact list, a user placing a call, or the like), the client may initiate and perform CSQI procedures with server 106A. The CSQI procedures are used to obtain CSQI values of the client device (referred to as "self"). The application client(s) on client devices 102A/102B may also request server 106A to provide CSQI's for other client devices using telecommunications services platform 106 (e.g., a contact selected from the contact list, a called party, or the like). In various embodiments, CSQI is an indicator of call session connection quality (e.g., audio quality) between a client device 102 and a server (e.g., server 106A) of a telecommunications services platform (e.g., a PTT platform) hosting the call session, calculated using parameters of an entire channel between the client device 102 and the server 106A.

In an embodiment, server 106A measures channel parameters of a pipeline between client devices 102 and server 10A by transmitting and receiving a sequence of packets to and from client devices 102A/102B. In some embodiments, the pipeline between client devices 102A/102B and server 106A includes through various components of network 104 (e.g., base station(s)/access point(s) serving client devices 102, gateway(s) connecting the base station(s)/access point(s) to a backhaul network of network 104, and components of the backhaul network connected to server 106A). The sequence of packets may include dummy audio data (e.g., prior to a call) or real audio data (e.g., during a call). As used herein, "dummy" audio data may be used to refer to audio data transmitted to determine channel parameters between a client and the server and may not include any audio data intended for playback to any users. "Real" audio data may include audio data that is recorded by a talker and forwarded to other client devices for playback to listeners (e.g., participants of the call session). In an embodiment, the packets are real-time transport protocol (RTP) packets, real-time transport control protocol (RTCP) packets, or the like. Each of the packets may include a transmission time stamp indicating a transmission time of a respective packet as well as a sequence number identifying a position of the respective packet within the packet sequence. A recipient of the packet sequence (e.g., a client device or the server) may use the transmission time stamps and sequence numbers of the packets to estimate end-to-end latency (e.g., by comparing receipt time and the transmission times stamps) and/or packet loss (e.g., by examining sequence numbers of received packets to determine if any packets were lost) parameters of a channel between the client device and the server. Furthermore, the recipient may further determine jitter by detecting variance in the time interval between receiving individual packets in the packet sequence. For example, under ideal channel conditions, a receiver expects to receive each packet of the packet sequence at a regular interval. Detected variation in the interval between received packets is referred to as jitter. Additionally, the recipient may estimate bandwidth of the channel by detecting the bit-rate of the packets. Other channel parameters may also be determined in other embodiments. These channel parameters may be determined, by server 106A, from packets received by the server. Furthermore, an application client may forward channel parameters determined, by an application client (e.g., from packets received by the client device), to server 106A in RTCP sender report (SR), RTCP receiver report (RR), RTCP extended report (XR), combinations thereof, and the like.

Subsequently, server 106A calculates CSQI of various application client(s) in accordance with the detected and received channel parameters (e.g., latency, packet loss, jitter, bandwidth, etc.). The CSQI is used to indicate estimated or current call quality to a user. Server 106A may determine CSQI's based on algorithms taking into account channel parameters directly measured by the server and/or channel parameter reports (e.g., RTCP SR/RR/XR) received from client devices 102. In an embodiment, server 106A uses passive monitoring technology (e.g., as provided by VQmon®) to calculate CSQI of client devices 102. In such embodiments, the passive monitoring technology may extend the International Telecommunication Union (ITU) G.107 E-model to estimate transmission quality of PIT call sessions (e.g., to provide CSQI). For example, the passive monitoring technology may consider the effects of loss bursts and significant burst recency in addition to other ITU G.107 E-model planning parameters. Server 106A may further combine metrics derived from the passive monitoring technology with a mean opinion score (MOS) of a client devices 102, diagnostic data under different PTT usability scenario(s) of the client device 102, and/or application client behavior(s) on the client device 102 sensitive to the time varying nature of call session quality (e.g., reduction in call session quality) to further estimate PTT call session quality (e.g., to provide CSQI) of the client device 102. Alternative methods for computing CSQI may also be used to derive CSQI, including methods for computing MOS. For example, a computed MOS of a client device 102 may be used as a CSQI. In such embodiments, the computed MOS may include the effects of delay and other parameters (e.g., burst packet loss, time variability of MOS, or the like) that affect conversational quality. For example, time variability of MOS may treat a change in MOS (e.g., from extremely good to extremely bad) within a short time period differently than a similar change in MOS (e.g., from extremely good to extremely bad) over a longer time period. In some embodiments, CSQI may be calculated by converting an R factor determined according to ITU-T G.107 or European Telecommunications Standards Institute (ETSI) TS 101329-5 into an estimated MOS using, for example, the algorithm specified in ITU-T G.107.

In other embodiments, the CSQI may be measured based on other connection quality metrics. For example, in another embodiment, server 106A and a client device 102 may perform a round trip test (RTT), which measures a packet's round trip delay. In an embodiment RTT, server 106A transmits a packet to a client device 102; the client device 102 receives the packet; and the client device 102 transmits the received packet back to server 106A. The server may measure the total time between transmitting the packet to receiving the packet back from the client device 102. The server then calculates CSQI based on latency observed in the RTT. An advantageous feature of this example is bandwidth conservation while still providing a CSQI. For example, RTT may use less bandwidth than the bandwidth used to determine the channel parameters discussed above (e.g., latency, jitter, packet loss, and bandwidth).

Server 106A may then transmit the CSQI's to respective client devices 102A and 102B. In some embodiments, CSQI's may be transmitted as a numerical value (e.g., an integer value ranging from 1 to 5) to client devices. Various numerical values indicating CSQI may be mapped to particular channel conditions (e.g., excellent, good, poor, bad, unavailable) using a mapping table known to server 106A and client devices 102. For example, the table mapping CSQI numerical values and a particular channel condition may be configured on a client device 102, by server 106A, during client application registration, or the like. In other embodiments, CSQI's may be transmitted to client devices 102 using a different mechanism.

The received CSQI's allow an application client to display visual indication(s) of network conditions of the client device (self) and other client devices using telecommunications services platform 106. The visual indication(s) may be displayed to the user on an appropriate screen (e.g., a contact screen, a call ready screen, an in-call screen during a call, a combination thereof, or the like) of an application client.

FIGS. 3A and 3B illustrate embodiment visual indications of CSQI. As illustrated by FIG. 3A, CSQI may be displayed as an icon having a particular pattern, color, shape, or the like, which may be used to distinguish different CSQI values (e.g., excellent, good, poor, bad, unavailable, analyzing, etc.). A table correlating CSQI values with a particular icon may be pre-configured on the application client by the telecommunications services platform, for example, during client registration, or the like. As illustrated by FIG. 3B, CSQI's may also be displayed as a sliding bar, which can slide between a best CSQI value (e.g., excellent) and a worst CSQI value (e.g., bad). In another embodiment, displayed CSQI's may also optionally include audio feedback or vibration feedback in addition to or in lieu of visual feedback. Thus, users are aware of estimated network connection quality prior to a call and/or determined network connection quality during a call.

Depending on the CSQI value range (e.g., excellent, good, poor, bad, etc.), the application client and/or server 106A may perform predetermined remedial actions. For example, when connection quality becomes poor (e.g., falls below a configurable threshold), the service may switch to a lower bitrate codec. As another example, when connection quality improves (e.g., increases above a configurable threshold), the service may switch to a higher bitrate codec. Codec adaptation can be either application client or server initiated based on system configuration. As yet another example, when the quality becomes bad beyond recovery (e.g., below a configurable threshold), server 106A may end the call and transmit an appropriate notification to the user.

In an embodiment, connection quality data (e.g., CSQI and/or channel parameters) are recorded for post processing. For example, an application client provides a CellID identifying cell where the client device is located when CSQI tests are performed. In an embodiment, the CellID may be transmitted with the sequence of packets measuring channel parameters and/or channel parameter reports (e.g., RTCP SR/RR/XR). Server 106A accumulates the CSQI and CellID information of application clients using platform 106, and server 106A archives this information in data store 106B for post-processing and/or generating reports by processor 106C. This information (e.g., correlating channel parameters and/or CSQI with CellID and/or time of day) may then be used to perform heuristic algorithms to predict network conditions. For example, historic CSQI data can be used heuristically to predict network conditions based on geographic area (e.g., based on CellIDs), time of day, etc. Various services provided by the telecommunications services platform may be adapted based on predicted network conditions. This information may also be provided to a network carrier (e.g., a provider of communications network 104) for network debugging or other applications.

Figure 4A:
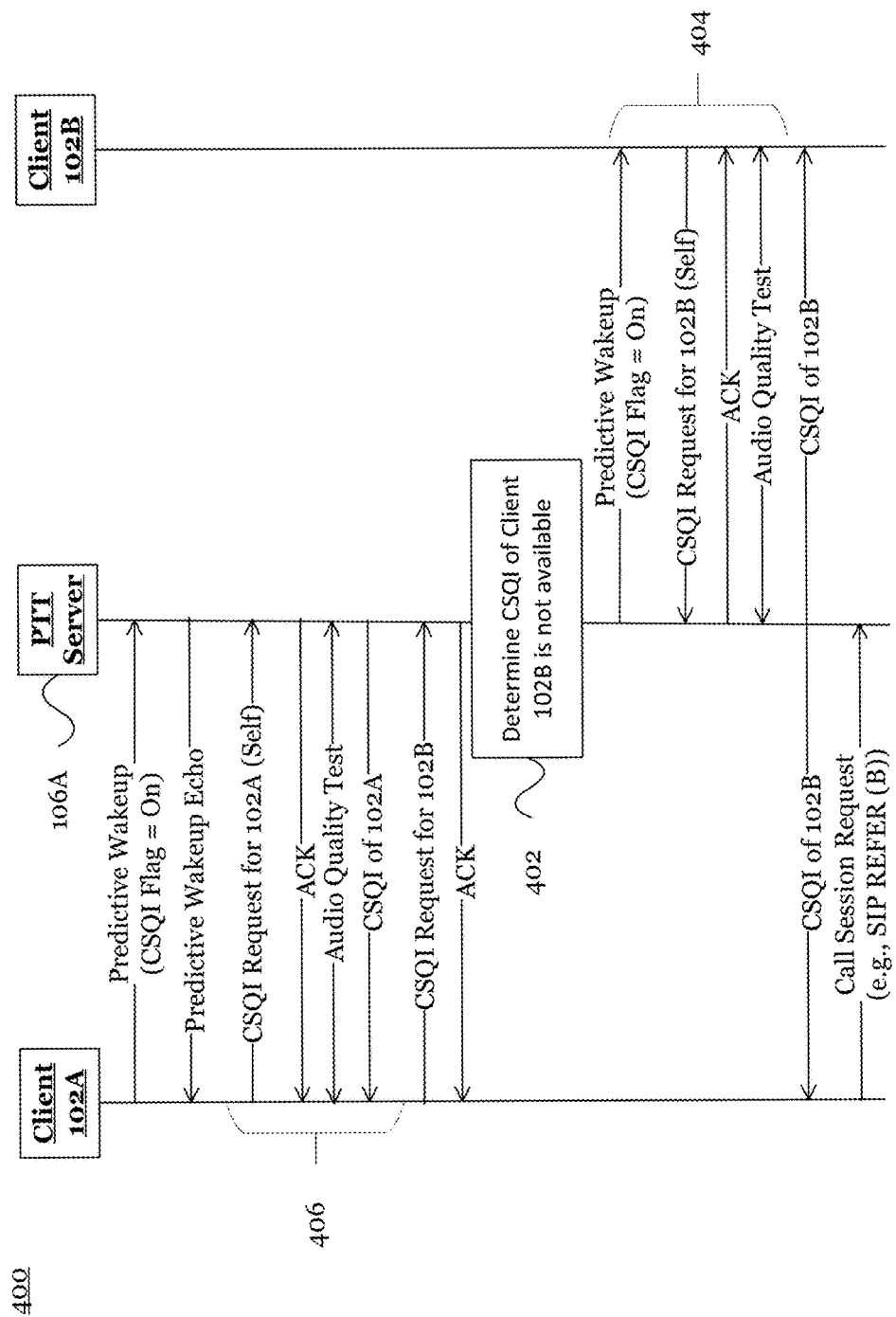
Figure 4B:
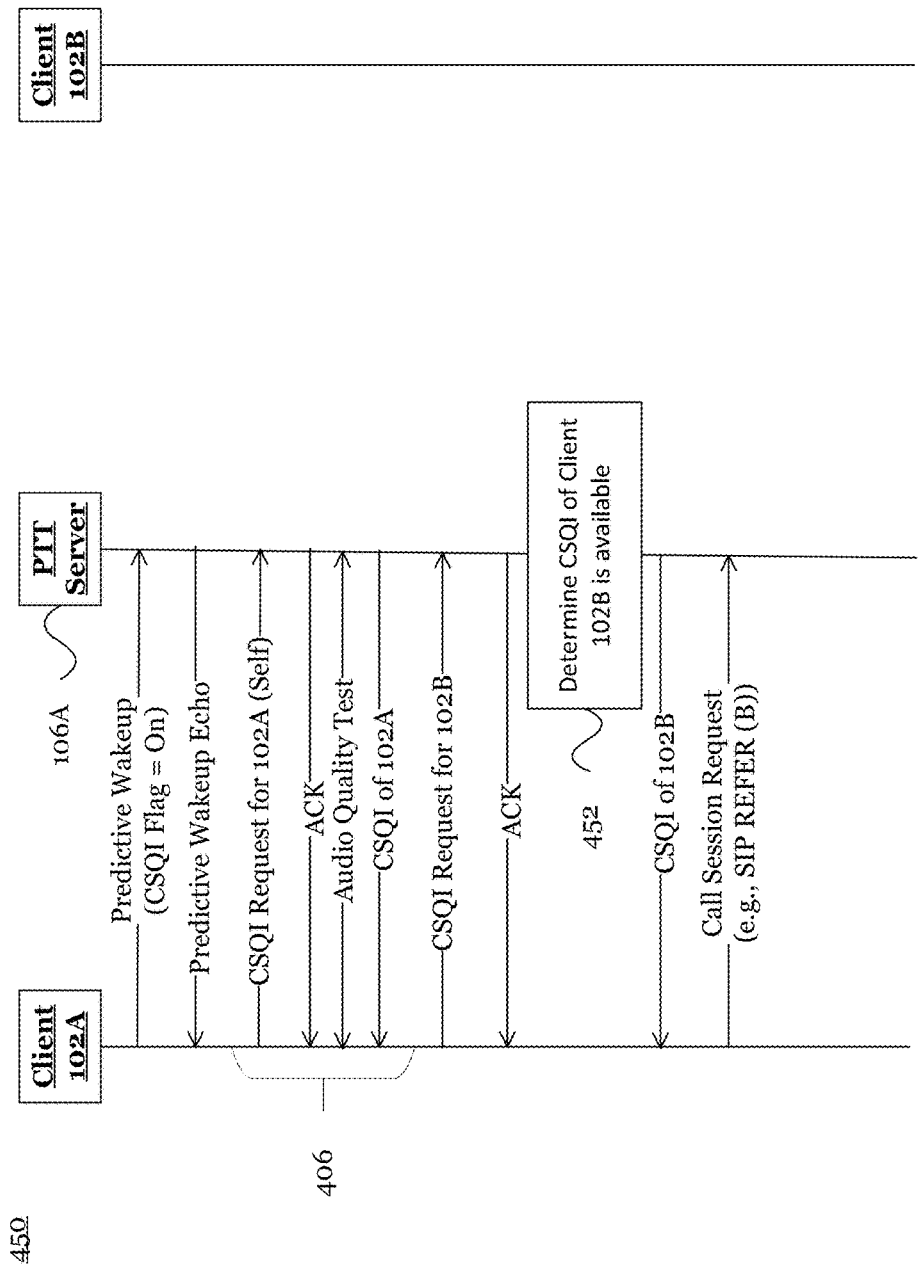

FIGS. 4A and 4B illustrates pre-call CSQI implementation process flows 400 and 450 according to some embodiments. In process flows 400 and 450, an application client on a client device 102A may request CSQI's from a server 106A. In some embodiments, server 106A is a PTT server, which may perform predictive wakeup, call setup, call tear down, and the like operations in a PIT platform. In other embodiments, server 106A may perform other functions. Process flows 400 and 450 describe mechanisms for determining estimated CSQI's of a client device 102A and contacts of client device 102A prior to call session initiation. For example, process flows 400 and 450 may describe embodiments where CSQI's are provided to client device 102A while client device 102A is not engaged in any active call sessions. Process flows 400 and 450 are sequential in time, with a lower relative position indicating signals transmitted at a later time.

In both process flows 400 and 450, client device 102A uses a predictive wakeup (PW) mechanism (e.g., as described in U.S. Pat. No. 8,478,261, entitled "Predictive Wakeup for Push-To-Talk-Over-Cellular (PoC) Call Setup Optimizations," which application is hereby incorporated by reference) to transmit a CSQI trigger and foreshadow CSQI tests with server 106A. For example, client device 102A may transmit a PW message to server 106A, and a CSQI flag within the PW message may be marked as "on." In other embodiments, CSQI triggers may be transmitted by an application client using a different signaling mechanism. For example, a dedicated CSQI trigger may be transmitted to server 106A or the CSQI trigger may be piggy backed on a different message from client 102A to server 106A. An application client on client device 102A may transmit the CSQI trigger in response to the application client detecting a CSQI trigger event being performed on the application client. In some embodiments, the CSQI trigger event includes a user launching a PIT application, a user bringing a PIT application to the foreground of the client device, a user moving to a contact list tab in the PIT application, a user selecting a contact from the contact list, client device 102A receiving a predictive wakeup message from server 106A, combinations thereof, or the like.

Client device 102A may wait for a CSQI trigger acknowledgment to verify applicable radio channels (e.g., between client device 102A and server 106A) are in a dedicated transport channel (DCH) or active state prior to starting CSQI tests in order to obtain more accurate channel parameter measurements and CSQI estimations from server 106A. Client device 102A may wait for a PW message response from server 106A (e.g., a PW Echo) prior to requesting a CSQI of client device 102A from server 106A. After the confirmation of an active channel (e.g., PW echo) is received, an application client on client device 102A may implement self CSQI procedure 406 with server 106A. Self CSQI procedure 406 beings with client device 102 transmitting a CSQI request to PTT server 106A for a CSQI of client device 102A. Self CSQI procedures 406 continues with server 106A transmitting an acknowledgment (ACK) and beginning audio quality tests with client device 102A in response to the CSQI request for client device 102A. In an embodiment, the audio quality tests may include the transfer of a sequence of dummy RTP packets between client device 102A and server 106A as described above; determining channel parameters (e.g., of the channel between server 106A and client device 102A) in accordance with the sequence of dummy RTP packets as described above; and server 106A calculating a CSQI for client device 102A based on the measured channel parameters as described above. In an embodiment, the measured channel parameters include latency, jitter, bandwidth, packet loss, combinations thereof, or the like. The various channel parameters may be determined by server 106A using measurements made by server 106A and/or reports (e.g., RTCP SR/RR/XR) transmitted to server 106A from client device 102A. In another embodiment, the measured channel parameters include RTT results. In some embodiments, the sequence of dummy RTP packets may include ambient noise recorded by client device 102A. In other embodiments, the sequence of dummy RTP packets may include dedicated dummy audio data, which may be provided by PTT server 106A (or another server of the PIT platform), for example, during client registration, or the like. In embodiments where the sequence of dummy RTP packets uses dedicated dummy audio data instead of ambient noise, an added benefit is the ability to avoid security/privacy concerns of making ambient noise recordings. After server 106A determines a CSQI for client device 102A, server 106A may transmit the CSQI for client device 102A to client device 102A in self CSQI procedure 406. In embodiment process flows 400 and 450, the CSQI for client device 102A is provided client device 102A prior to call session initiation (e.g., prior to client device 102A transmitting a call session initiation request). Thus, a user operating client device 102A may be aware of estimated call quality prior to making a call (e.g., while the user is not engaged in any active call sessions). After client device 102A receives the CSQI of client device 102A, client device 102A may initiate a call session, such as, by transmitting a call session request to server 106A.

Process flows 400 and 450 may continue with an application client on client device 102A transmitting a CSQI request for a CSQI of another client device (e.g., client device 102B) to PTT server 106A. An application client on client device 102A may transmit the CSQI request for client device 102B to server 106A in response to the application client detecting a CSQI trigger event being performed on the application client. In some embodiments, the CSQI trigger event includes when a user when a user moves to a specific contact (e.g., user of client device 102B) on a contact list tab in the PTT application, when the user selects a specific contact (e.g., client device 102B) from the contact list, combinations thereof, or the like.

Next, server 106A determines if a recent CSQI is available for client device 102B. For example, server 106A may determine if a CSQI value has been determined for client device 102B within a configurable time period. If a CSQI of client device 102B is not available (see step 402 of process flow 400 in FIG. 4A), server 106A initiates a CSQI procedure 404 with client device 102B. CSQI procedure 404 may include server 106A sending a predictive wakeup message (or other message) with a CSQI trigger (e.g., CSQI flag marked as "on") to client device 102B. In some embodiments, the predictive wakeup message (or other CSQI trigger) wakes up client device 102B and ensures channels between PIT server 106A and client device 102B are in a DCH or active state prior to starting CSQI tests in order to get more accurate channel parameter measurements and CSQI estimations. Waking up client device 102B may have an additional benefit of reducing end-to-end call setup times between client device 102A and client device 102B when a call session is subsequently initiated between client devices 102A and 102B.

CSQI procedure 404 continues with an application client on client device 102B transmitting a CSQI request to PTT server 106A for a CSQI of client device 102B after receiving the CSQI trigger. CSQI procedure 404 continues with server 106A transmitting an ACK and beginning audio quality tests with client device 102B in response receiving to the CSQI request for client device 102B. In an embodiment, the audio quality tests may include the transfer of a sequence of dummy RTP packets between client device 102B and server 106A as described above; determining channel parameters (e.g., of the channel between server 106B and client device 102A) in accordance with the sequence of dummy RTP packets as described above; and server 106A calculating a CSQI of client device 102B based on the measured channel parameters as described above. In an embodiment, the measured channel parameters include latency, jitter, bandwidth, packet loss, combinations thereof, or the like. The various channel parameters may be determined by server 106A using measurements made by server 106A and/or reports (e.g., RTCP SR/RR/XR) transmitted to server 106A from client device 102B. In another embodiment, the measured channel parameters include RTT results. In some embodiments, the sequence of dummy RTP packets may include ambient noise recorded by client device 102B. In other embodiments, the sequence of dummy RTP packets may include dedicated dummy audio data, which may be provided by PTT server 106A (or another server of the PTT platform) to client device 102B, for example, during client registration, or the like. In embodiments where the sequence of dummy RTP packets uses dedicated dummy audio data instead of ambient noise, an added benefit is the ability to avoid security/privacy concerns of making ambient noise recordings. After server 106A determines a CSQI for client device 102B, server 106A may transmit the CSQI of client device 102B to client device 102A and (optionally) client device 102B. Server 106A may further cache the determined CSQI's of client devices 102A and 102B for subsequent CSQI requests (e.g., from client device 102A, client device 102B, or other client devices). The cached CSQI values may be valid for a configurable time period, and the cached values may be cleared once the configurable time period expires.

FIG. 4A illustrates an embodiment when server 106A does not have access to client device 102B's CSQI value (e.g., when a server 106A does not have a cached CSQI value of client device 102B), and hence, the server initiates a CSQI procedure for client device 102B. FIG. 4B an alternative when server 106B has a valid cached CSQI of client device 102B. Referring to FIG. 4B, when server 106A determines a CSQI of client device 102B is available (see step 452), server 106A may provide the cached CSQI of client device 102B to client device 102A in response to a CSQI request for client device 102B from client device 102A. In process flow 450, server 106A may return client device 102B's CSQI value to client device 102A without a CSQI trigger or CSQI procedures with client device 102B because a cache of client device 102B's CSQI was available to server 106A.

In an embodiment, the CSQI of client device 102B is provided to client device 102A prior to call session initiation (e.g., while client device 102A is not actively engaged in any call sessions). In such embodiments, after client device 102A receives the CSQI of client device 102B, client device 102A may initiate a call session with client device 102B, such as, by transmitting a call session request to server 106A. In another embodiment, a user operating client device 102A may initiate a call session with client device 102B before the CSQI of client device 102B is provided by PIT server 106A. In such embodiments, the CSQI of client device 102B may be displayed to a user of client device 102A (e.g., on a call screen) when available.

Figure 5A:
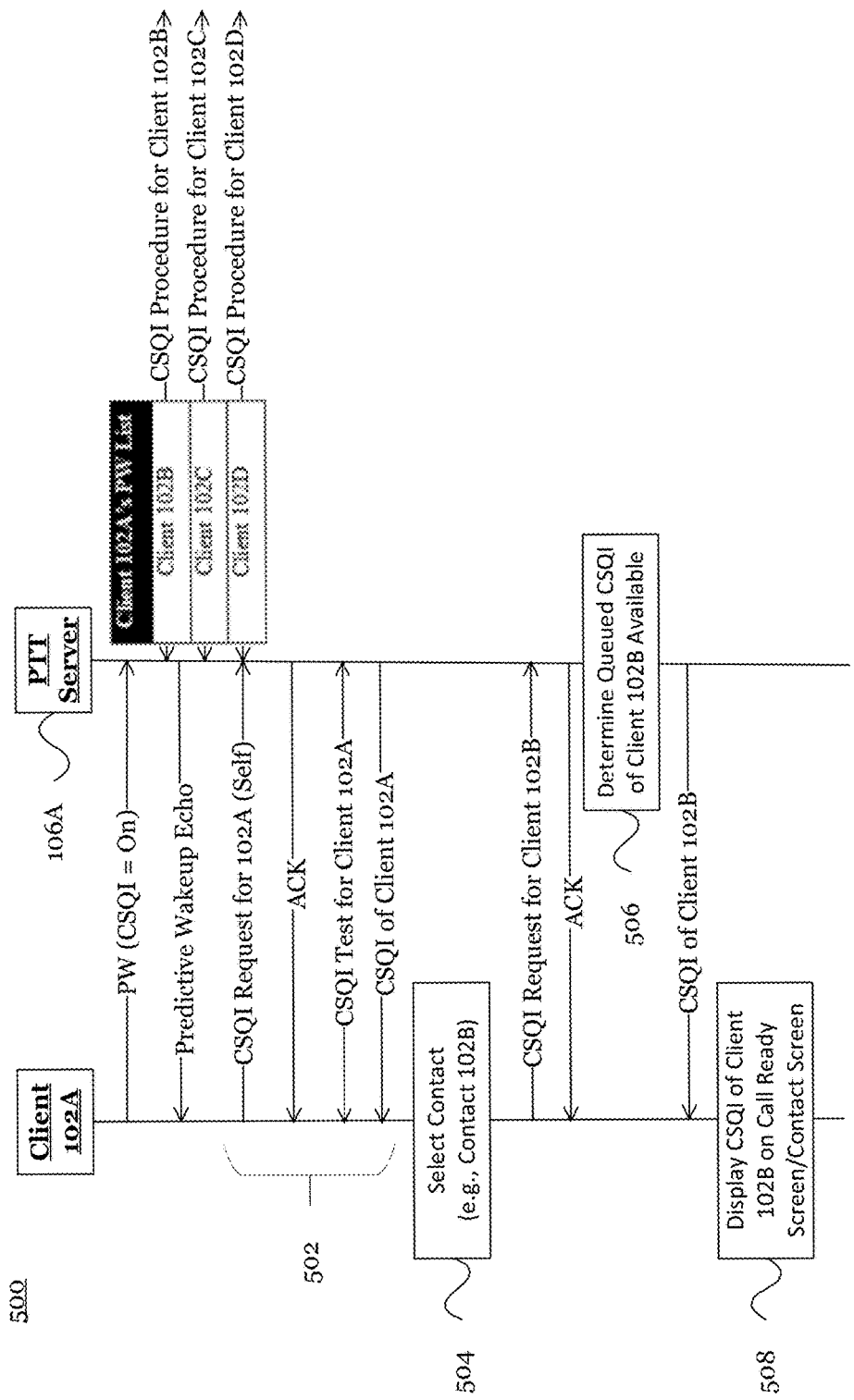
Figure 5B:
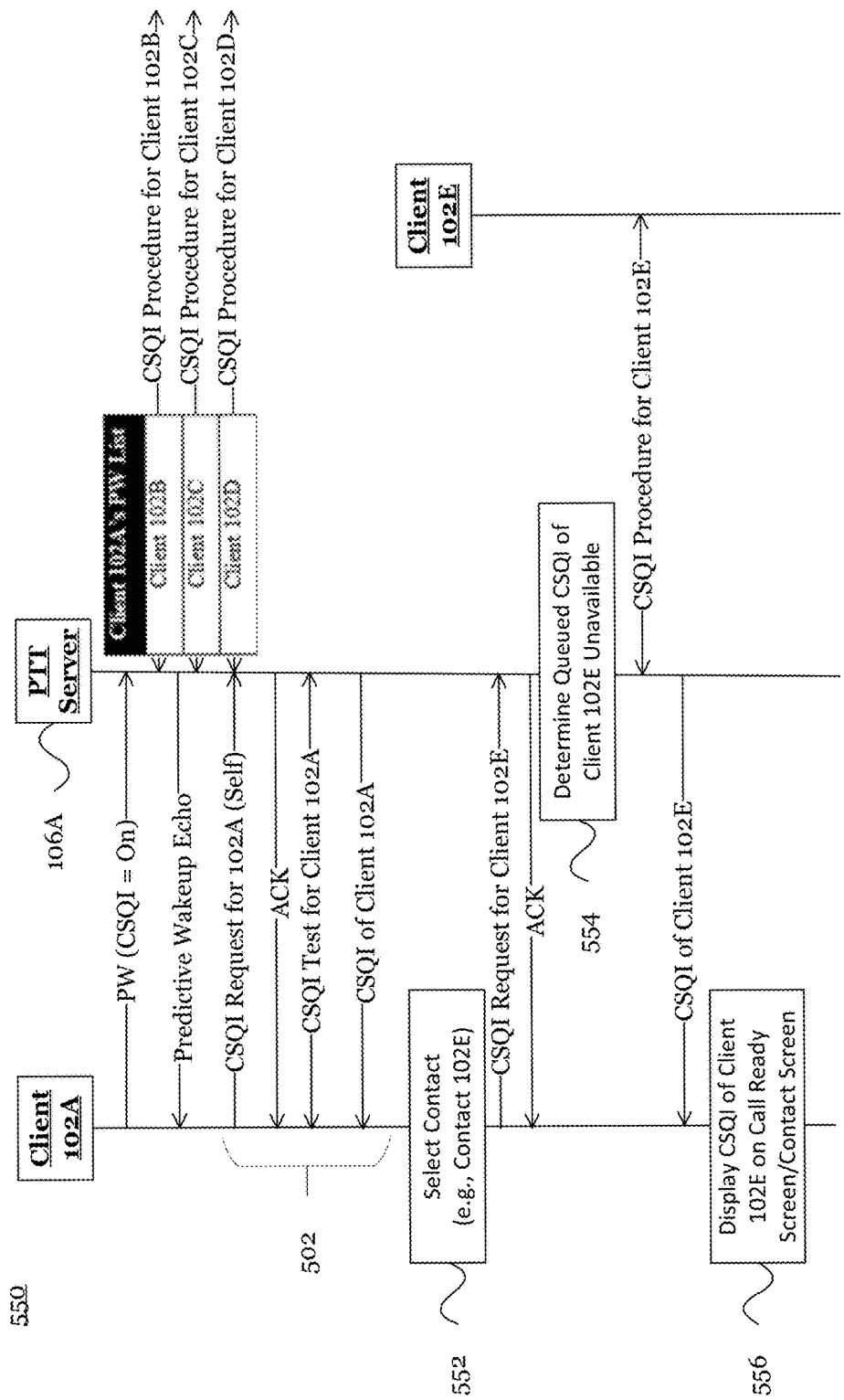

FIGS. 5A and 5B illustrates CSQI implementation process flows 500 and 550 using predictive wakeup mechanisms according to some embodiments. In process flows 500 and 550, an application client on a client device 102A may request CSQI's from a server 106A. In some embodiments, server 106A is a PIT server, which may perform predictive wakeup, call setup, call tear down, and the like operations in a PTT platform. In other embodiments, server 106A may perform other functions. Process flows 500 and 550 describe mechanisms for determining estimated CSQI's of a client device 102A and contacts of client device 102A prior to call session initiation. Process flows 500 and 550 are sequential in time, with a lower relative position indicating signals transmitted at a later time.

Process flows 500 and 550 may utilize a predictive wakeup framework (e.g., as described in U.S. Pat. No. 8,478,261) to proactively determine CSQI's of client devices (e.g., client devices 102B, 102C, and 102D), which client device 102A is likely call, in advance of client device 102A requesting a call session or CSQI values. By proactively determining and caching CSQI values, delays in providing CSQI's of client devices may be advantageously reduced. In process flows 500 and 550, client device 102A transmits a PW trigger to server 106A with a CSQI flag when client device 102A launches a PIT application. In response to the PW trigger with CSQI flag, server 106A may initiate CSQI procedures with client devices on a PW list of client device 102A (e.g., client devices 102B, 102C, and 102D in FIGS. 5A and 5B). The PW list of client device 102A identifies other client devices 102B-102D, which client device 102A is likely to contact based on historic event of client device 102A. For example, client device 102A's PW list includes the most recent contacts who client device 102A has contacted (e.g., called, messaged, or the like) within a configurable time period, contacts who client device 102A frequently contacts (e.g., having a more than a configurable threshold of calls/messages/etc. within a set time period), contacts who a user of client device 102A manually adds to the PW list, combinations thereof, or the like.

The CSQI procedures initiated by server 106A may be substantially similar to CSQI procedure 404 described above in FIG. 4A. For example, server 106A may transmit a PW message having a CSQI trigger to each contact in client device 102A's PW list. In response to a received CSQI trigger, a contact (e.g., client devices 102B, 102C, or 102D) in client device 102A's PW list may transmit a CSQI request to server 106A; server 106A may determine channel parameters of a channel between server 106A and the contact (e.g., client devices 102B, 102C, or 102D) in client device 102A's PW list as described above; and server 106A may determine a CSQI for the contact (e.g., client devices 102B, 102C, or 102D) in client device 102A's PW list in accordance with determined channel parameters as described above. Server 106A may cache the determined CSQI values of contacts in client device 102A's PW list in anticipation of CSQI requests from client device 102A. The determined CSQI values of contacts in client device 102A's PW list may be cached for a configurable time period before the cached value(s) are cleared.

While server 106A implements CSQI procedures with contacts (e.g., client devices 102B, 102C, or 102D) in client device 102A's PW list, client device 102A may also perform a self CSQI procedure 502 as illustrated in FIGS. 5A and 5B. Self CSQI procedure 504 may be substantially similar to self CSQI procedure 406 as described above in FIGS. 4A and 4B. For example self CSQI procedure 502 may include client device 102A transmitting a CSQI request to server 106A for a CSQI of client device 102A; server 106A determining channel parameters of a channel between server 106A and the client device 102A; and server 106A determining a CSQI for the client device 102A in accordance with determined channel parameters as described above. In other embodiments, self CSQI procedures 502 may be implemented prior to or after server 106A implements CSQI procedures with contacts (e.g., client devices 102B, 102C, or 102D) in client device 102A's PW list.

Process flow 500 (see FIG. 5A) continues with a user of client device 102A selecting a contact (e.g., client device 102B) from a contact list in block 504. In response to the user selecting the contact (client device 102B), the application client on client device 102A may request a CSQI of client device 102B from server 106A. In block 506, server 106A determines a valid cached CSQI of client device 102B is available. In the described embodiments, the cached CSQI value of client device 102B may be available because client device 102B is on a PW list of client device 102A, and server 106A proactively implemented CSQI procedures with contacts on client device 102A's PW list prior to block 504. Thus, server 106A may return the CSQI of client device 102B without performing additional measurements or calculations. When client device 102A receives the CSQI of client device 102B, client device 102A may graphically represent the applicable CSQI's (e.g., CSQI's of client devices 102A and/or 102B) to a user of client device 102A in block 508.

Process flow 550 (see FIG. 5B) illustrates an alternative when a user of client device 102A selects a contact (e.g., client device 102E) from a contact list in block 552. In response to the user selecting the contact (client device 102E), the application client on client device 102A may request a CSQI of client device 102E from server 106A. In block 554, server 106A determines a valid cached CSQI value of client device 102E is unavailable. In the described embodiments, the cached CSQI value of client device 102E may be unavailable because client device 102E is not on a PW list of client device 102A. Thus, server 106A did not proactively implemented CSQI procedures with client device 102E prior to block 552. Therefore, in response to the received request and unavailable CSQI, server 106A may implement CSQI procedures with client device 102E. The CSQI procedures with client device 102E may be substantially similar to CSQI procedure 404 described above in FIG. 4A. For example, server 106A may transmit a PW message having a CSQI trigger to client device 102E. In response to a received CSQI trigger, client device 102E may transmit a CSQI request to server 106A; server 106A may determine channel parameters of a channel between server 106A and client device 102E as described above; and server 106A may determine a CSQI for client device 102E as described above. Server 106A then transmits the CSQI of client device 102E to client device 102A. Server 106A may also cache the determined CSQI of client device 102E in anticipation of future CSQI requests from client device 102A or other client devices. When client device 102A receives the CSQI of client device 102E, client device 102A may graphically represent the applicable CSQI's (e.g., CSQI's of client devices 102A and/or 102E) to a user of client device 102A in block 556.

Figure 6A:
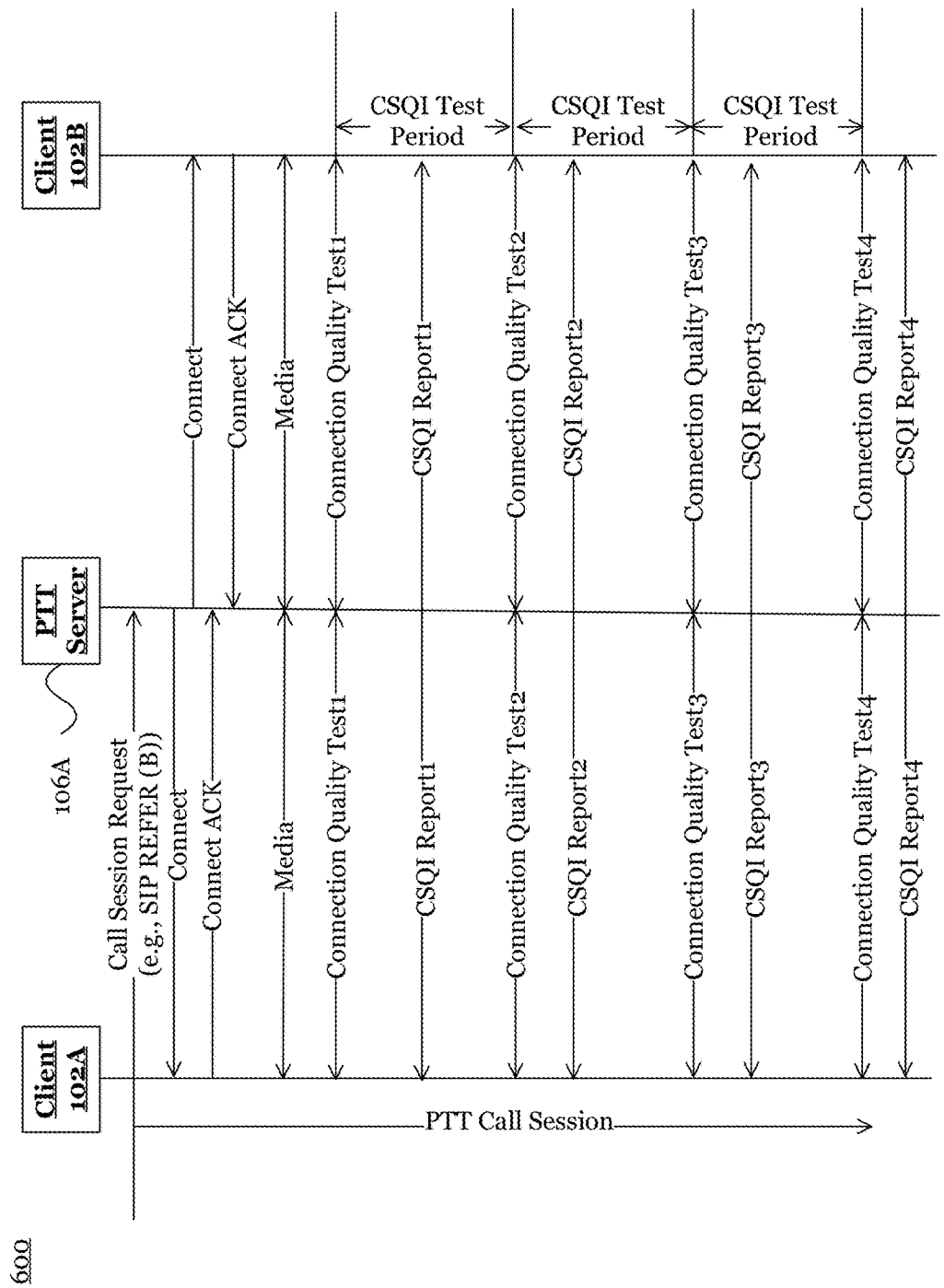

FIGS. 6A and 6B illustrates CSQI implementation process flows 600 and 650 during a call session according to some embodiments. In process flows 600 and 650, server 106A determines CSQI's for parties of a call session at regular and/or random intervals. In some embodiments, server 106A is a PIT server, which may perform predictive wakeup, call setup, call tear down, and the like operations in a PTT platform. In other embodiments, server 106A may perform other functions. Process flows 600 and 650 are sequential in time, with a lower relative position indicating signals transmitted at a later time.

Referring first to FIG. 6A, client device 102A may initiate a PIT call session by transmitting a call session request (e.g., a session initiation protocol (SIP) REFER transmission) to server 106A. In response to the call session request, PTT server 106A may connect client devices 102A and 102B to a call session. Embodiment call sessions may include 1-1 call sessions (e.g., between two client devices) or group call sessions (e.g., between client device 102A and a plurality of client devices 102B). During the PTT call session, server 106A may perform periodic connection quality tests with participants (e.g., client devices 102A and 102B) of the call session at regular intervals (labeled CSQI Test Period in FIG. 6A). An interval between connection quality tests may be configured by the server. In some embodiments, the interval between connection quality tests may be 5 seconds, 10 seconds, or another value.

Connection quality tests may include server 106A determining channel parameters of channels between server 106A and participants of the call session. Determining channel parameters may include using sequences of packets containing real audio data that is transferred between client devices 102A and 102B as part of the PTT call session. For example, server 106A may measure jitter, latency, packet loss, bandwidth, combinations thereof, or the like using a sequence of packets comprising real audio data. Channel parameters may be determined by server 106A based on measurements made by server 106A and/or reports (e.g., RTCP SR/RR/XR) provided by client devices 102A and 102B. In some embodiments, client devices 102A and 102B may automatically transmit such channel parameter reports at regular intervals (e.g., as configured by server 106B) without requiring explicit requests from server 106B. Server 106A accumulates and calculates the CSQI's for client devices 102A and 102B based on determined channel parameters. Server 106A may periodically provide CSQI reports to participants (e.g., client devices 102A and 102B) of the call session. In some embodiments, each CSQI report may include self CSQI's (e.g., a CSQI of a client device receiving the CSQI report) and a talker's CSQI (e.g., a CSQI value of a client device with floor control). In an embodiment group call session, server 106A may provide a group average CSQI (e.g., averaged CSQI's of participants in the group call session) in the CSQI report to participants of the group call session.

FIG. 6B illustrates a process flow 650 for adapting codecs and/or bit-rates during a call session based on CSQI variation according to some embodiments. As described in process flow 600 (see FIG. 6A), server 106A computes CSQI's for participants of a call session throughout the duration of the call session. When server 106A detects change(s) in CSQI's for one or more participants (e.g., client devices) of the call session (block 602), server 106A may adapt codecs and/or bit-rates based on the detected change and improve quality of service. For example, when server 106A detects a deteriorating CSQI for a client device, the server sends an indication to the client device (or a client device with floor control) to lower a codec and/or bit-rate in response to the deteriorating CSQI. Embodiment call sessions may use Adaptive Multi-Rate (AMR) 1 through 7 codecs. Thus, lowering a codec and/or bitrate may include changing a codec from AMR 7 (e.g., having a bit-rate of about 12 kbps) to AMR 3 (e.g., having a bit-rate of about 3 kbps). When the connection gets better (e.g., CSQI improves), server 106A may indicate to one or more client devices to increase the codec and/or bit-rate appropriately.

Furthermore, prior to or during a call, a client device with floor control may select a codec and bit-rate based on self CSQI, CSQI of a called party, group average CSQI for a group call, combinations thereof, or the like. In another embodiment, server 106A may select a codec and/or bit-rate for each leg of a call session based on a CSQI of a target client device of a respective leg, group average CSQI for a group call, combinations thereof, or the like. Server 106A may perform the selected transcoding for legs that are not capable of using a talker's codec or for legs where a different codec than a talker's codec is desirable. In some embodiments, server 106A may group client devices in specific codec groups (e.g., based on CSQI's of various client devices), and codec/bit-rate adaptation can be selected on a group-by-group basis in order to reduce the processing used by the server for CSQI adaptation. For example, server 106A may group client devices having a same CSQI (or CSQIs within a set range) as a single group, and server 106A may adapt codecs and/or bit-rates for client devices in a group as a whole.

In various embodiments, obtaining CSQI values enables the client devices to perform one or more of the following non-limiting functions UI Feedback/Indication during pre-call (e.g., before making a call) as well as during a call; determine CSQI values for both participants of a 1-1 call and present the connection quality information of both self and target graphically to a user; determine CSQI values for self, talker (if the talker is a participant client device), a group average, or a combination thereof in a group call and present connection quality information graphically to a user; and codec and/or bitrate adaptation based on CSQI values.

Figure 7:
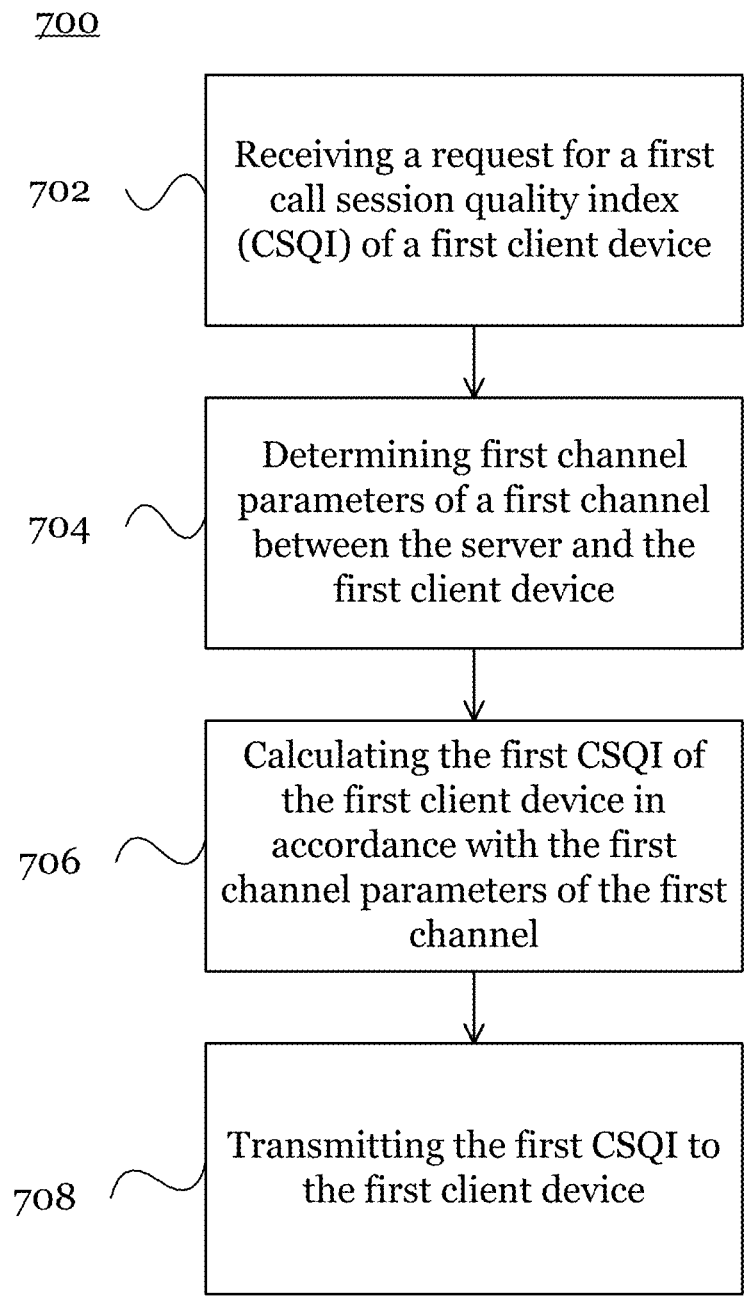
FIGS. 7 and 8 illustrate embodiment process flows according to various embodiments.

FIG. 7 illustrates a process flow 700 of server activity (e.g., server 106A) according to various embodiments. Process flow 700 begins with step 702 and the server receiving a request for a first CSQI of a first client device (e.g., client device 102A) from the first client device. In some embodiments, the server may receive a CSQI trigger prior to receiving the request for the CSQI. The CSQI trigger may be used to ensure a channel between server and the first client device is in an active or DCH state prior to requesting CSQI. In step 704, the server determines first channel parameters of a first channel between the server and the first client device. In some embodiments, the first channel parameters are parameters of an entire pipeline between the first client device through base station(s)/access point(s) serving the first client device, through gateway(s) connecting the base station(s)/access point(s) to a backhaul network, and through components of the backhaul network to the server. Determining the first channel parameters may include using a sequence of packets transmitted between the server and the first client device to measure jitter, packet loss, latency, bandwidth, combinations thereof, or the like. In some embodiments, the sequence of packets may include dummy audio data (e.g., when the first CSQI is requested prior to a call) or real audio data (e.g., when the first CSQI is requested during a call session). In other embodiments, determining the first channel parameters may include a RTT. The server may determine the first channel parameters using measurements made by the server and/or channel parameter report(s) transmitted to the server by the first client device.

Next, in step 706, the server may calculate the first CSQI in accordance with the first channel parameters. For example, the server may apply an algorithm to the first channel parameters as described above. In step 708, the server may transmit the calculated first CSQI to the first client device. In some embodiments, the server provides the first CSQI to the first client device prior to a call session. Thus, the server may receive a call session initiation request from the first client device after providing the first CSQI.

In other embodiments, the first CSQI is provided during a call session. For example, the server may determine CSQI's of participants of a call session at regular intervals throughout the call session. The server may send periodic CSQI reports (e.g., comprising updated CSQI's of the first client device, a talker of the call session, a group average CSQI, combinations thereof, or the like) to the first client device. Furthermore, the server may trigger codec and/or bit-rate adaptations for one or more legs of the call session in response to a detected change in CSQI of one or more participants.

In some embodiments, the first client device may further request a second CSQI of a second client device prior to or during the call session. In response to the request for the second CSQI, the server may determine if a valid cached CSQI of the second client device is available to the server. If a cached CSQI of the second client device is available, the server may forward the cached CSQI of the second client device to the first client device. If a cached CSQI of the second CSQI is not available, the server may determine second channel parameters of a second channel between the server and the second client device. In some embodiments, the second channel parameters are parameters of an entire pipeline between the second client device through base station(s)/access point(s) serving the second client device, through gateway(s) connecting the base station(s)/access point(s) to a backhaul network, and through components of the backhaul network to the server. Determining the second channel parameters may include using a sequence of packets transmitted between the server and the second client device to measure jitter, packet loss, latency, bandwidth, combinations thereof, or the like. The server may further calculate the second CSQI in accordance with the second channel parameters.

Figure 8:
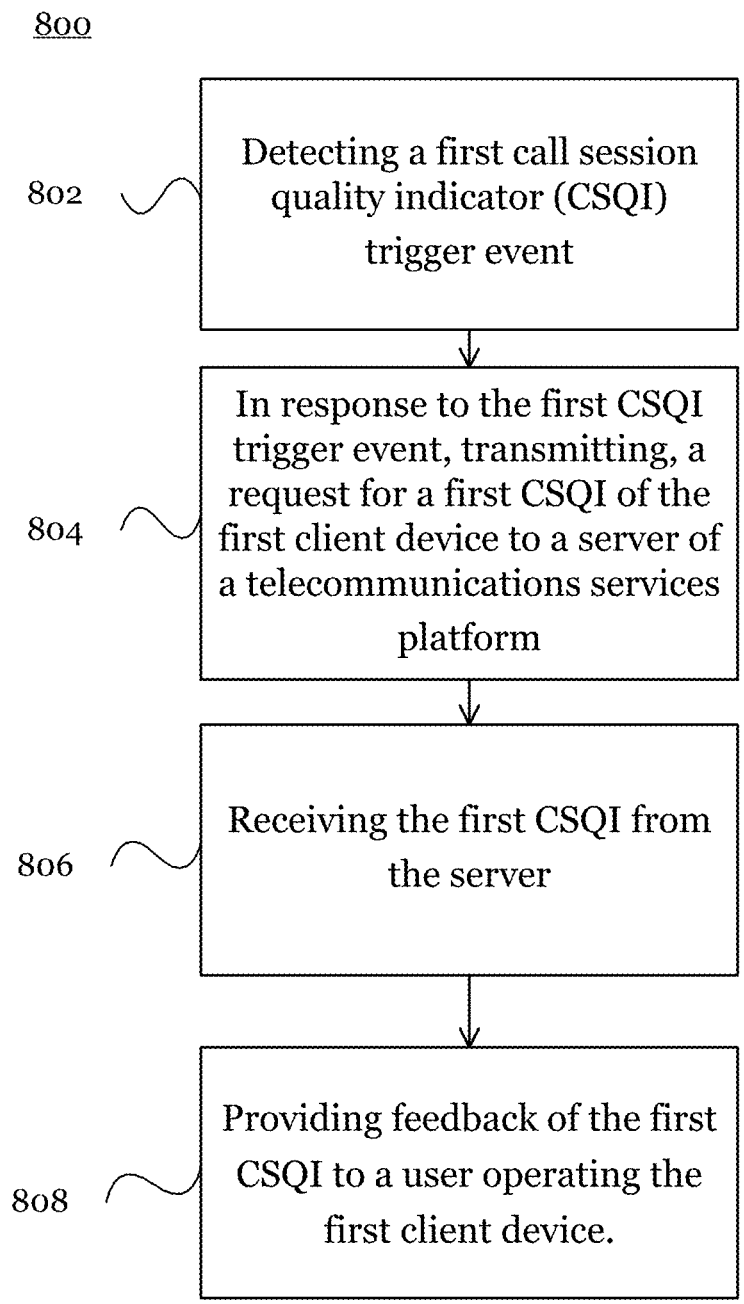

FIG. 8 illustrates a process flow 800 of application client activity on a client device (e.g., client device 102A) according to various embodiments. Process flow 800 begins in step 802 with the application client detecting a first CSQI trigger event. In some embodiments, the first CSQI trigger event may include a user of the first client device launching the application client, the user bringing the application client to a foreground of the first client device, the user moving to a contact list tab in the application client, the user selecting a contact from a contact list, the first client device receiving a predictive wakeup message from the server, or a combination thereof. In response to the first CSQI trigger event, the application client may transmit a request for a first CSQI of the first client device to a server (e.g., server 106A) in step 804. In some embodiments, the application client may first transmit a CSQI trigger to the server and wait for an acknowledgment of the CSQI trigger prior to transmitting the request for the CSQI.

In step 806, the application client may receive the first CSQI from the server. The first CSQI may be received prior to a call session (e.g., while the first client device is not actively engaged in any call sessions) or during a call session. In step 808, the application client may provide feedback of the first CSQI to the user operating the first client device. The feedback may include visual feedback (e.g., as described above with respect to FIGS. 3A and 3B), audio feedback, vibrational feedback, combinations thereof, or the like.

In some embodiments, the application client may further detect a second CSQI trigger event (e.g., when a user selects a second client device from a contact list of the application client). In response to the second CSQI trigger event, the application client may transmit a request for a second CSQI of a second client device to the server. The application client may further receive the second CSQI from the server and provide feedback of the second CSQI to the user. The feedback of the second CSQI may be provided either before a call session (e.g., when the first client device is not engaged in an active call session with the second client device) or during a call session between the first and second client devices.

Figure 9:
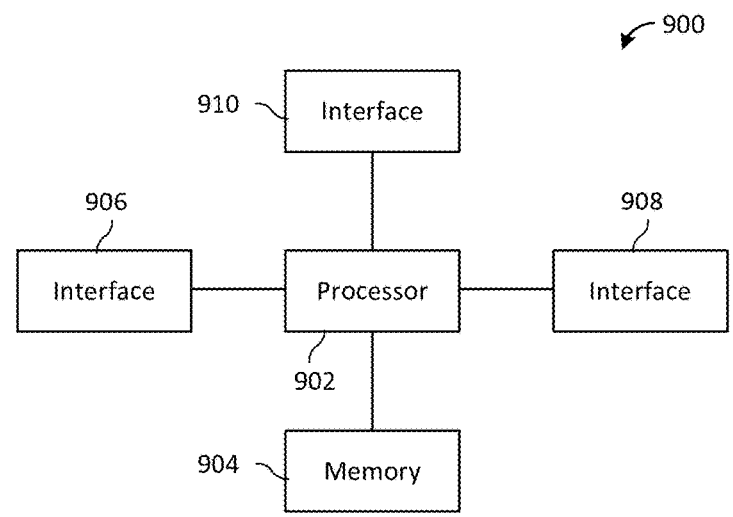
FIG. 9 is a block diagram of an embodiment processing system.

FIG. 9 is a block diagram of an embodiment processing system 900 for performing methods described herein, which may be installed in a host device. As shown, the processing system 900 includes a processor 902, a memory 904, and interfaces 906-910, which may (or may not) be arranged as shown in FIG. 9. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components and/or a user. For example, one or more of the interfaces 906, 908, 910 may be adapted to communicate data, control, or management messages from the processor 902 to applications installed on the host device and/or a remote device. As another example, one or more of the interfaces 906, 908, 910 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
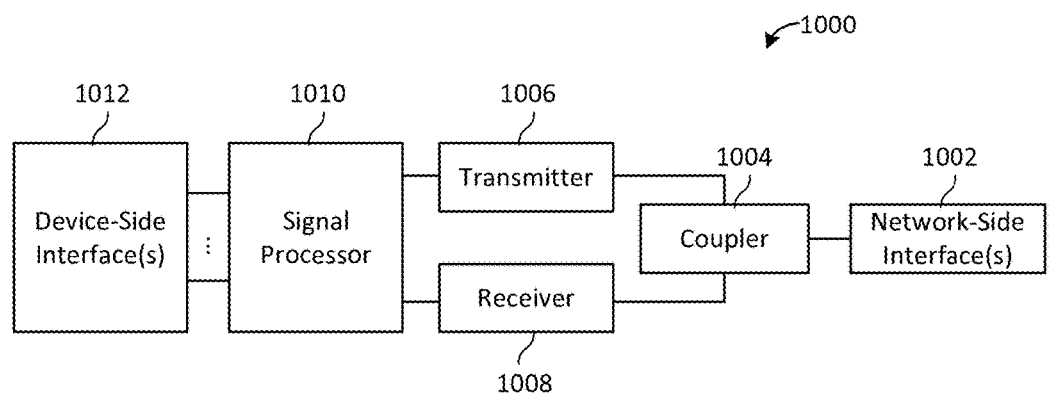
FIG. 10 is a block diagram of an embodiment transceiver.

In some embodiments, one or more of the interfaces 906, 908, 910 connects the processing system 900 to a transceiver adapted to transmit and receive signaling over the telecommunications network. FIG. 10 is a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 602 comprises one or more antenna/radiating elements. For example, the network-side interface 602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving, by a server of a telecommunications services platform, a request for a first call session quality indicator (CSQI) of a first client device;
   determining, by the server, first channel parameters of a first channel between the server and the first client device;
   calculating, by the server, the first CSQI of the first client device in accordance with the first channel parameters of the first channel;
   transmitting, by the server, the first CSQI to the first client device; and
   receiving, by the server, a call session initiation request from the first client device after transmitting the first CSQI to the first client device.

2. The method of claim 1, wherein determining the first channel parameters comprises:
   transmitting a sequence of packets between the server and the first client device, wherein the sequence of packets comprises dummy audio data; and
   determining the first channel parameters in accordance with measurements made using the sequence of packets.

3. The method of claim 1, wherein determining the first channel parameters comprises receiving a real-time transport control protocol (RTCP) extended report (XR), a RTCP sender report (SR), a RTCP receiver report (RR), or a combination thereof from the first client device.

4. The method of claim 1 further comprising receiving a CSQI trigger prior to receiving the request for the first CSQI of the first client device.

5. The method of claim 1 further comprising:
   receiving, by the server, a request for a second CSQI of a second client device from the first client device;
   determining, by the server, the second CSQI; and
   transmitting, by the server, the second CSQI to the first client device.

6. The method of claim 5, wherein the determining the second CSQI comprises determining, by the server, a cached second CSQI of the second client device is available to the server.

7. The method of claim 6, wherein the second client device is a contact on a predictive wakeup (PW) list of the first client device, and wherein the method further comprises:
   determining, by the server, second channel parameters of a second channel between the server and the second client device; and
   calculating, by the server, the second CSQI of the second client device in accordance with the second channel parameters of the second channel prior to receiving the request for the second CSQI.

8. The method of claim 5, wherein determining the second CSQI comprises:
   transmitting, by the server, a CSQI trigger to the second client device;
   receiving, by the server, a CSQI request for the second CSQI from the second client device;
   determining, by the server, second channel parameters of a second channel between the server and the second client device; and
   calculating, by the server, the second CSQI of the second client device in accordance with the second channel parameters of the second channel after receiving the request for the second CSQI.

9. The method of claim 1 further comprising:
   initiating, by the server, a call session between the first client device and one or more second client devices in response to the call session initiation request;
   determining, by the server, respective CSQI's of participants of the call session at regular intervals throughout the call session; and
   transmitting, by the server, a CSQI report to the first client device, wherein the CSQI report comprises at least a third CSQI of the first client device.

10. The method of claim 9, wherein the CSQI report further comprises a fourth CSQI of a client device of the one or more second client devices with floor control, an average group CSQI of the one or more second client devices, or a combination thereof.

11. The method of claim 9 further comprising:
    detecting, by the server, a change in CSQI of a participant of the call session; and
    adapting, by the server, a codec, bit-rate, or a combination thereof of at least one leg of the call session in response to the change in CSQI.

12. The method of claim 9 wherein the telecommunications services platform is a push-to-talk (PTT) platform, and wherein the method further comprises:
    receiving, by the server, a CellID identifying a cell where the first client device is located;
    storing, by the PTT platform, the first CSQI, the first channel parameters, or a combination thereof; and generating one or more reports in accordance with the first CSQI, the first channel parameters, or the combination thereof.

13. A method comprising:
   detecting, by an application client on a first client device, a first call session quality indicator (CSQI) trigger event;
   in response to the first CSQI trigger event, transmitting, by the application client, a request for a first CSQI of the first client device to a server of a telecommunications services platform, wherein the request for the first CSQI is transmitted while the first client device is not actively engaged in any call sessions;
   receiving, by the application client, the first CSQI from the server; and
   providing, by the application client, feedback of the first CSQI to a user operating the first client device.

14. The method of claim 13 further comprising after providing feedback of the first CSQI, transmitting, by the application client, a call session initiation request to the server.

15. The method of claim 13, wherein providing feedback of the first CSQI comprises displaying an icon indicating the first CSQI on a screen of the application client, displaying a sliding bar indicating the first CSQI on a screen of the application client, providing audio feedback of the first CSQI, providing vibrational feedback of the first CSQI, or a combination thereof.

16. The method of claim 13 further comprising:
   determining, by the application client, one or more channel parameters of a first channel between the first client device and the server; and
   transmitting, by the application client, the one or more channel parameters in a channel parameter report to the server, wherein the first CSQI is determined in accordance with the channel parameter report.

17. The method of claim 13, wherein the first CSQI trigger event comprises the user launching the application client, the user bringing the application client to a foreground of the first client device, the user moving to a contact list tab in the application client, the user selecting a contact from a contact list, the first client device receiving a predictive wakeup message from the server, or a combination thereof.

18. The method of claim 13 further comprising:
   detecting, by the application client, a second CSQI trigger event;
   in response to the second CSQI trigger event, transmitting, by the application client, a request for a second CSQI of a second client device to the server;
   receiving, by the application client, the second CSQI from the server; and
   providing, by the application client, feedback of the second CSQI to the user.

19. The method of claim 18, wherein the second CSQI trigger event comprises the user selecting the second client device from a contact list.

20. A server of a push-to-talk (PTT) platform comprising:
   a processor; and
   a non-transitory computer readable storage medium storing programming for execution by the processor, the programming including instructions to:
      receive a request for a first call session quality indicator (CSQI) of a first client device;
      determine first channel parameters of a first channel between the server and the first client device;
      calculate the first CSQI of the first client device in accordance with the first channel parameters of the first channel;
      transmit the first CSQI to the first client device; and
      receive a call session initiation request from the first client device after transmitting the first CSQI to the first client device.

21. The server of claim 20, wherein the first channel parameters comprise jitter, latency, bandwidth, packet loss, or a combination thereof.

22. The server of claim 20, wherein the first channel parameters are determined in accordance with a sequence of packets transmitted between the server and the first client device.

23. The server of claim 20, wherein the programming includes further instructions to:
   imitate a call session between the first client device and one or more second client devices in response to the call session initiation request;
   determine respective CSQI's of participants of the call session at regular intervals throughout the call session; and
   transmit a CSQI report to the first client device, wherein the CSQI report comprises at least a third CSQI of the first client device.

24. The server of claim 23, wherein the programming includes further instructions to:
   detect a change in CSQI of a participant of the call session; and
   adapt a codec, bit-rate, or a combination thereof of at least one leg of the call session in response to the change in CSQI.

* * * * *